United States Patent
Park

(10) Patent No.: US 7,711,255 B2
(45) Date of Patent: May 4, 2010

(54) CAMERA-EQUIPPED PORTABLE TERMINAL AND PHOTOGRAPH TRANSMISSION METHOD USING THE SAME

(75) Inventor: Jin-Yong Park, Masan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 11/447,945

(22) Filed: Jun. 7, 2006

(65) Prior Publication Data

US 2007/0189746 A1    Aug. 16, 2007

(30) Foreign Application Priority Data

Feb. 13, 2006    (KR)    ...................... 10-2006-0013464

(51) Int. Cl.
G03B 17/00    (2006.01)

(52) U.S. Cl. ...................................... 396/56; 348/211.2

(58) Field of Classification Search .................... 396/56, 396/57; 455/66.1, 344; 348/211.2
See application file for complete search history.

(56) References Cited

U.S. PATENT DOCUMENTS

| 7,196,718 | B1 * | 3/2007 | Barbeau et al. | .......... | 348/14.02 |
| 7,346,342 | B2 * | 3/2008 | Kirbas | ........................ | 455/415 |
| 7,432,954 | B2 * | 10/2008 | Hama | ........................ | 348/211.2 |
| 2004/0240434 | A1 * | 12/2004 | Sato et al. | .................... | 370/352 |
| 2005/0136953 | A1 | 6/2005 | Jo et al. | | |

FOREIGN PATENT DOCUMENTS

| CN | 1675926 A | 9/2005 |
| EP | 1441555 | 7/2004 |
| KR | 2001-63189 | 7/2001 |
| KR | 1020010063189 | 7/2001 |
| KR | 1020050109195 | 11/2005 |
| KR | 1020050109843 | 11/2005 |
| KR | 1020060021044 | 3/2006 |
| WO | WO 03061309 | 7/2003 |
| WO | WO 03061309 A | 7/2003 |

OTHER PUBLICATIONS

"Nokia 6681" Dec. 15, 2005 Nokia, Finnland, Retrieved from the Internet:URL:http://web.archive.org/web, http://ndsl.nokia.com/phones/files/guides/Nokia_668, pp. 1-8 and pp. 53,54.
Nokia 6681, Dec. 15, 2005, Finnland, XP002432382, pp. 1-8, pp. 53, 54.

* cited by examiner

Primary Examiner—Melissa J Koval
Assistant Examiner—Autumn Parker
(74) Attorney, Agent, or Firm—Roylance, Abrams, Berdo & Goodman, L.L.P.

(57) ABSTRACT

A camera-equipped portable terminal facilitating convenient transmission of taken photographs and method therefor are provided. The portable terminal has a display unit for displaying at least one input address, a camera module for taking one or more photographs of target objects, a wireless communication module for transmitting the photographs taken by the camera module to the input address through wireless communication, and a controller. The controller controls address display of the display unit, target-object image display of the camera module through the display unit in response to a photography mode command during display of the input address, a photograph-taking operation of the camera module in response to a photograph-taking command, and photograph transmission of the wireless communication module. As a result, photographs taken for transmission can be rapidly and conveniently transmitted to a destination address.

15 Claims, 5 Drawing Sheets

CAMERA-EQUIPPED PORTABLE TERMINAL AND PHOTOGRAPH TRANSMISSION METHOD USING THE SAME

CROSS-REFERENCE TO RELATED APPLICATIONS

This application claims the benefit under 35 U.S.C. §119(a) of a Korean Patent Application Serial No. 2006-0013464, filed in the Korean Intellectual Property Office on Feb. 13, 2006, the entire contents of which is hereby incorporated by reference.

BACKGROUND OF THE INVENTION

1. Field of the Invention

The present invention relates generally to a camera-equipped portable terminal. More particularly, the present invention relates to a portable terminal comprising a camera that can easily send photographs taken by the camera to a recipient, and to a photograph transmission method using the portable terminal.

2. Description of the Related Art

In general, a portable terminal is a terminal that can be carried with a person and is capable of supporting, through application programs, various functions such as wireless communication. A personal mobile communication terminal, personal digital assistant (PDA), smart phone, International Mobile Telecommunications-2000 (IMT-2000) terminal and wireless local area network (LAN) terminal are examples of portable terminals.

Early portable terminals were only capable of supporting voice telephone services and short message transmission. Advances in technology have provided portable terminals with various capabilities necessary for image telephone communication, electronic reminder, voice or image storage, Internet access and entertainment. In addition to these capabilities, portable terminals comprising digital cameras have recently been developed. The user can use a portable terminal comprising a digital camera to take preferred moving or still images, store them, use them as background screens, or send such images to an e-mail recipient or another portable terminal.

A camera-equipped portable terminal can store image data transmitted from a base station, and send captured image data to a base station. The portable terminal comprises a camera for photographing images, and a display unit for displaying the images photographed by the camera. The camera may be made of a charge coupled device (CCD) sensor or a complementary metal oxide semiconductor (CMOS) sensor. The display unit may be a liquid crystal display (LCD) device. The miniaturization of camera-related components has led to a decrease in the size of portable terminals comprising cameras.

A camera-equipped portable terminal is capable of sending taken photographs to another person. FIG. 1 illustrates a conventional method of photograph transmission using a portable terminal comprising a camera.

As shown in FIG. 1, when a photograph-taking command is input in a photography mode, the portable terminal takes a photograph of a target object at step S11 and stores the taken photograph at step S13. The portable terminal then determines whether a photograph transmission mode command is input at step S15.

If a command other than the photograph transmission mode command is input, the portable terminal performs an operation corresponding to the input command. If the photograph transmission mode command is input, the portable terminal switches the operation mode to a photograph transmission mode at step S17.

In the photograph transmission mode, the portable terminal receives and displays a telephone number or e-mail address of a recipient at step S19. The portable terminal determines whether a photograph transmission command is input to transmit the photograph taken at step S11 to the input telephone number or e-mail address at step S21. If a photograph transmission command is not input, the portable terminal performs steps S19 to S21.

If the photograph transmission command is input, the portable terminal transmits the photograph taken at step S11 to the telephone number or e-mail address at step S23.

In a conventional photograph transmission method using a portable terminal comprising a camera, sending the taken photograph to the recipient takes a long time because the user may have to take the photograph and then input the address of a recipient.

In addition, to sending multiple photographs to the same recipient, the user may have to input the identical address multiple times.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a portable terminal comprising a camera that can rapidly send a photograph taken by the camera to a recipient address, and a photograph transmission method using the portable terminal.

Another object of an exemplary embodiment of the present invention is to provide a portable terminal comprising a camera that can easily and rapidly send multiple photographs taken by the camera to a recipient address, and a photograph transmission method using the portable terminal.

In accordance with an exemplary embodiment of the present invention, there is provided a camera-equipped portable terminal. A display unit displays at least one input address, a camera module takes one or more photographs of target objects, and a wireless communication module transmits the photographs taken by the camera module to the input address through wireless communication. A controller controls address display of the display unit, target-object image display of the camera module through the display unit in response to a photography mode command during display of the input address, a photograph-taking operation of the camera module in response to a photograph-taking command, and photograph transmission of the wireless communication module.

The display unit displays status information during transmission of the photographs to the input address. The display unit may display a selection menu facilitating a user's determination of whether to store each photograph.

The input address may comprise at least one of a phone number, e-mail address, and address of a website permitting photograph upload. The photographs may be still or moving images.

The camera-equipped portable terminal may further comprise a memory unit that temporarily stores the input address displayed on the display unit in response to the photography mode command, and deletes the temporarily stored input address after completion of transmission of the photographs to the input address.

According to another exemplary embodiment of the present invention, there is provided a camera-equipped portable terminal. A display unit displays at least one input address, a camera module takes one or more photographs of target objects, and a wireless communication module transmits one or more selected photographs of the taken photographs to the input address through wireless communication. A controller controls address display of the display unit, target-object image display of the camera module through the display unit in response to a photography mode command during display of the input address, a photograph-taking operation of the camera module in response to a photograph-taking command, and selected-photograph transmission of the wireless communication module in response to a photograph transmission command.

The input address may comprise at least one of a phone number, e-mail address, and address of a website permitting photograph upload. The photographs may be still or moving images.

The camera-equipped portable terminal may further comprise a memory unit which temporarily stores, in response to the photography mode command, the input address displayed on the display unit and the photographs taken by the camera module, and deletes the temporarily stored input address and photographs after completion of the selected-photograph transmission to the input address.

In accordance with another exemplary embodiment of the present invention, there is provided a photograph transmission method using a camera-equipped portable terminal. At least one address is input and the input address is displayed. A camera module to display images of target objects is operated in response to a photography mode command during display of the input address. One or more photographs of the displayed images are taken in response to a photograph-taking command during target-object image display and the taken photographs are transmitted to the input address.

The photograph transmission method may further comprise the step of temporarily storing the displayed address in response to the photography mode command.

The photograph transmission method may further comprise the step of deleting the temporarily stored address after completion of photograph transmission.

The input address may comprise at least one of a phone number, e-mail address, and address of a website permitting photograph upload. The photographs may be still or moving images.

In accordance with another exemplary embodiment of the present invention, there is provided a photograph transmission method using a camera-equipped portable terminal. At least one address is input and the input address is displayed. A camera module to display images of target objects is operated in response to a photography mode command during display of the input address. One or more photographs are taken in response to a photograph-taking command during target-object image display. One or more of the taken photographs are selected for transmission in response to a photograph selection command and the one or more photographs selected for transmission are transmitted to the input address in response to a selected-photograph transmission command.

The photograph transmission method may further comprise the step of temporarily storing the displayed address in response to the photography mode command. The photograph transmission method may further comprise the step of deleting the temporarily stored address after completion of selected-photograph transmission.

The input address may comprise at least one of a phone number, e-mail address, and address of a website permitting photograph upload. The photographs may be still or moving images.

In a feature of an exemplary embodiment of the present invention, after input of a destination address, photographs taken in a photography mode are automatically transmitted to the destination address, or photographs selected by the user of those taken are directly transmitted to the destination address, and thereby photographs taken for transmission can be rapidly and conveniently transmitted to the destination address.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
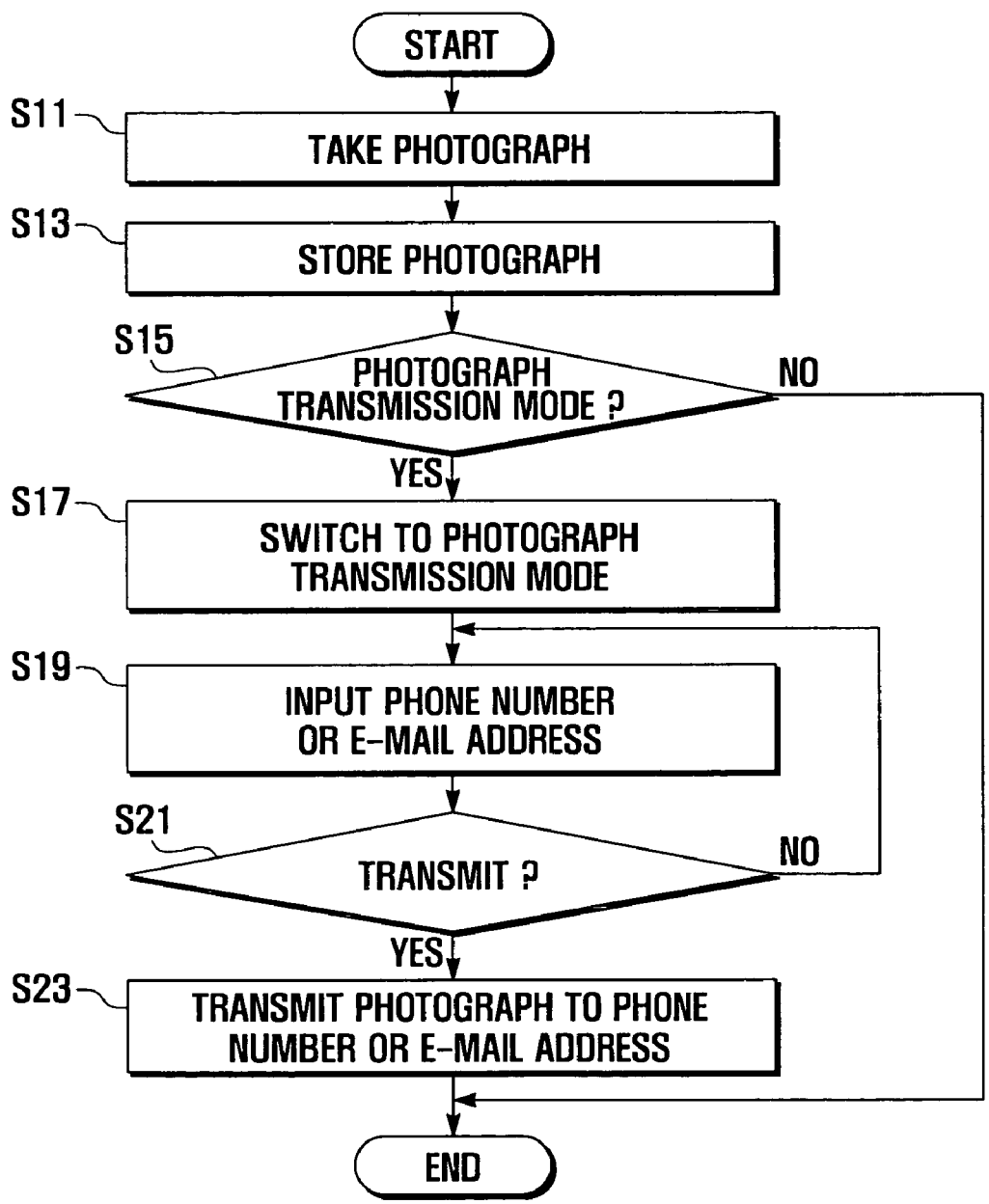
FIG. 1 is a flow chart illustrating a conventional method of photograph transmission using a camera-equipped portable terminal.
Figure 2:
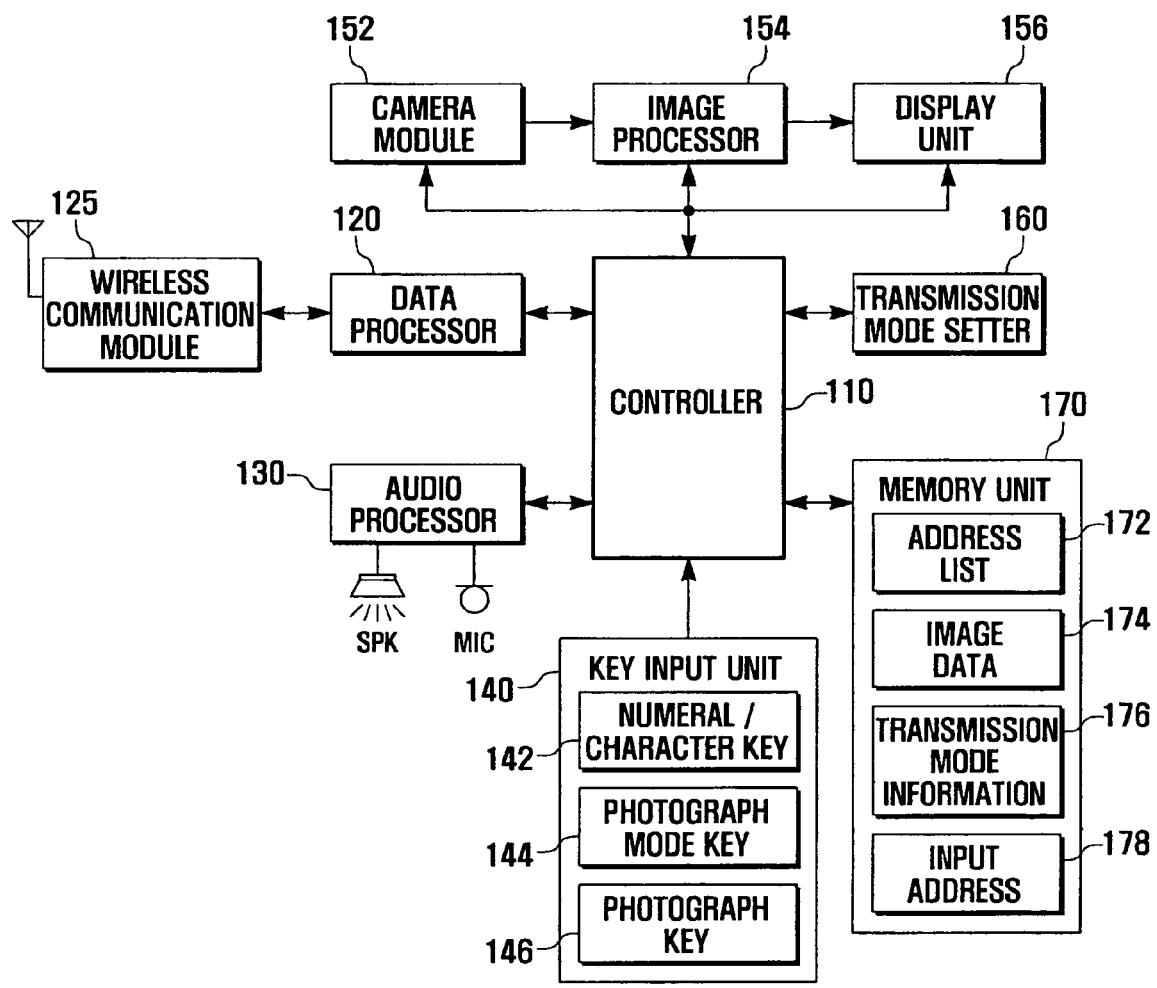
FIG. 2 is a block diagram illustrating the configuration of a camera-equipped portable terminal facilitating rapid transmission of photographs according to an exemplary embodiment of the present invention.

FIG. 2 is a block diagram illustrating the configuration of a camera-equipped portable terminal facilitating rapid transmission of photographs according to an exemplary embodiment of the present invention.

As shown in FIG. 2, the portable terminal comprises a controller 110, a data processor 120, a wireless communication module 125, an audio processor 130, a key input unit 140, a camera module 152, an image processor 154, a display unit 156, a transmission mode setter 160, and a memory unit 170.

The controller 110 controls the overall operation of the portable terminal. In an exemplary embodiment of the present invention, the controller 110 also controls transmission of photographs taken by the camera module 152 to an input address. The address comprises a phone number, e-mail address, or address of a website permitting photograph upload, recorded in an address list. The address may be extracted from a list of recent calls or a send or receive short message box, or directly input through the key input section 140. The address of a website represents address information regarding a personal homepage on an Internet network or a website permitting data upload via an Internet network.

In an exemplary embodiment of the present invention, if an address such as a phone number, e-mail address, or address of a website permitting photograph upload is input, the controller 110 temporarily stores the address. When photographs are taken by the camera module 152, the controller 110 controls automatic transmission of the photographs to the temporarily stored address. In another exemplary embodiment of the present invention, if an address is input, the controller 110 temporarily stores the address. When photographs are taken by the camera module 152, the controller 110 temporarily stores the photographs and displays the photographs, and controls transmission of those photographs selected by the user to the temporarily stored address in response to an input transmission command.

The data processor 120 comprises a transmission module for encoding and modulating a signal to be transmitted through a wireless channel, and a reception module for demodulating and decoding a signal received through a wireless channel. The data processor 120 demodulates and decodes data received through the wireless communication module 125, such as a taken photograph, to provide the demodulated and decoded data to the controller 110. Under the control of the controller 110, the data processor 120 encodes and modulates data, such as a taken photograph, for transmission to output the encoded and modulated data to the wireless communication module 125.

The wireless communication module 125 performs wireless data transmission and reception operations for the portable terminal, and may comprise a radio frequency (RF) transmitter for up-converting the frequency of a transmit signal and amplifying the transmit signal, and an RF receiver for low-noise amplifying a receive signal and down-converting the frequency of the amplified receive signal. The wireless communication module 125 may receive data, such as a taken photograph, through a wireless channel to feed the received data to the data processor 120. The wireless communication module 125 also inputs data, such as a taken photograph, from the data processor 120 to transmit the input data through a wireless channel to a corresponding address.

The audio processor 130 may comprise a coder/decoder (codec). The codec may comprise a data codec for processing packet data and the like, and an audio codec for processing an audio signal such as a voice signal. In voice communication of the portable terminal, the audio processor 130 converts a digital audio signal from the data processor 120 into an analog signal through the audio codec to reproduce the analog signal through a speaker SPK, and converts an analog audio signal from a microphone MIC into a digital audio signal through the audio codec to provide the digital audio signal via the controller 110 to the data processor 120. In an exemplary embodiment of the present invention, during transmission of a photograph taken in real time to an input address under the control of the controller 110, the audio processor 130 may inform the user of the status of the transmission in a voice signal. For example, the audio processor 130 may output a voice signal "Photographs are being transmitted to an input address".

The key input unit 140 comprises a plurality of keys for inputting numerals and characters, and a plurality of control keys for controlling operations of the portable terminal. In an exemplary embodiment of the present invention, the key input unit 140 comprises numeral/character keys 142 for inputting address information, a photograph mode key 144 for inputting a mode change command to operate the camera module 152 for photographing, and a photograph key 146 for inputting a command to control the camera module 152 for photographing a target object.

The camera module 152 comprises a lens for forming an image, a camera sensor for converting an optical signal corresponding to the formed image into an electrical signal, and a signal processor for converting the analog electrical signal from the camera sensor into digital data. The camera sensor may be a charge-coupled device (CCD) sensor, and the signal processor may be a digital signal processor (DSP). The camera sensor and signal processor may be realized as separate bodies or as a single body.

The image processor 154 generates screen data to display a digitalized image signal from the camera module 152. The image processor 154 processes the image signal from the camera module 152 on a frame-by-frame basis to output frame image data corresponding to display characteristics and the size of the display unit 156. The image processor 154 comprises a video codec to compress frame image data to be displayed on the display unit 156 in a predetermined format and to decompress compressed frame image data into frame image data. The video codec may be a Joint Photographic Experts Group (JPEG) codec, Moving Picture Experts Group (MPEG) codec or wavelet codec. The image processor 154 may also perform an on screen display (OSD) function, and output display data to be displayed in a predetermined area of a screen under the control of the controller 110.

The display unit 156 displays image data from the image processor 154 and display data from the controller 110 on a screen. When liquid crystal display (LCD) technologies are applied to the display unit 156, the display unit 156 may comprise an LCD controller, a memory for storing image data, and an LCD device. The LCD device with a touch screen capability may also act as an input device. In an exemplary embodiment of the present invention, the display unit 156 also displays addresses and menus output from the controller 110 for entering into a camera mode, and previews images that are captured by the lens of the camera module 152 and output from the image processor 154 in the camera mode. The display unit 156 also previews photographs recently taken, and displays status information regarding transmission of the taken photographs to an address given in advance under the control of the controller 110.

The transmission mode setter 160 sets a transmission mode for taken photographs under the control of the controller 110. Set transmission modes may be illustrated as follows. In a first transmission mode, when an address is input and images are then captured, photographs of the images are automatically transmitted to the input address. In a second transmission mode, when an address is input and images are then captured, photographs of the images are previewed, and then photographs selected by the user are transmitted to the input address.

When a photograph-taking command is input after input of an address, the controller 110 refers to transmission mode information set by the transmission mode setter 160 to control subsequent processing of taken photographs.

The memory unit 170 stores executable programs of the portable terminal, and data resulting from execution of the programs. In an exemplary embodiment of the present invention, the memory unit 170 also stores an address list 172, image data 174 captured by the camera module 152, transmission mode information 176 set by the transmission mode setter 160, and an input address 178 that is output from the controller 110 and displayed on the display unit 156. The image data 174 and input address 178 may be temporarily stored and removed after the transmission of taken photographs.

After a destination address is input, photographs taken in a photography mode are automatically transmitted to the destination address, or specific photographs selected by the user are directly transmitted to the destination address. Therefore photographs taken for transmission can be rapidly and conveniently transmitted to the destination address.

FIGS. 3A to 3F are display screen representations of information displayed on the display unit 156 during transmission of photographs using the camera-equipped portable terminal of FIG. 2.

Figure 3:
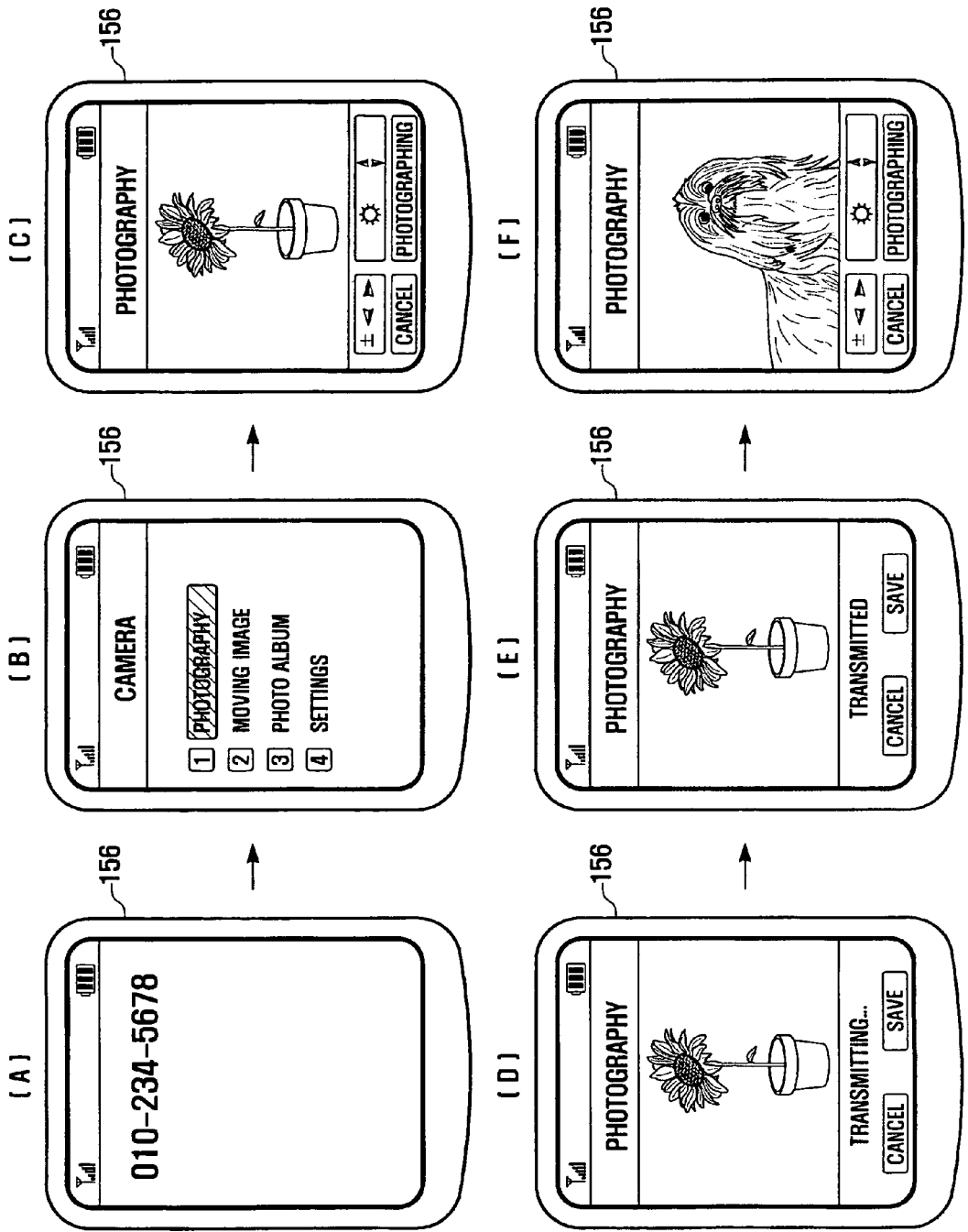
FIGS. 3A to 3F are display screen representations of information displayed on a display unit during transmission of photographs using the camera-equipped portable terminal of FIG. 2.

FIG. 3A illustrates an example of an input phone number chosen from possible addresses comprising a phone number, e-mail address, and address of a website permitting photograph upload. When a phone number is input through the key input unit 140 or is selected from the address list 172 stored in the memory unit 170, the controller 110 displays the input or selected phone number through the display unit 156.

In an exemplary implementation, when the photograph mode key 144 is input, as shown in FIG. 3B, the controller 110 displays menu items operable by the camera module 152 through the display unit 156. If a menu item of photography is selected, as shown in FIG. 3C, the controller 110 controls the camera module 152 to enter into a photography mode, and previews images captured by the camera module 152 through the display unit 156.

According to an exemplary embodiment of the present invention, when a photograph-taking command is input, the controller 110 controls the data processor 120 and wireless communication module 125 to transmit a photograph taken as shown in FIG. 3D to the phone number shown in FIG. 3A, and displays status information on the transmission. After transmission of the photograph, as shown in FIG. 3E, the controller 110 displays the photograph and informs of transmission completion through the display unit 156, and permits the user to determine whether to save the photograph. If a save command is input, the controller 110 stores the photograph as a portion of the image data 174 in the memory unit 170. Alternatively, if a cancel command is input, the controller 110 deletes the displayed photograph.

In an exemplary implementation, after the save or cancel command is processed, as shown in FIG. 3F, the controller 110 controls the camera module 152 to reenter into the photography mode shown in FIG. 3C, and previews images captured by the camera module 152 through the display unit 156.

In another exemplary embodiment of the present invention, the controller 110 may control photograph transmission so that taken photographs are not immediately transmitted but only those photographs selected by the user after photographing are transmitted to the phone number shown in FIG. 3A.

Figure 4:
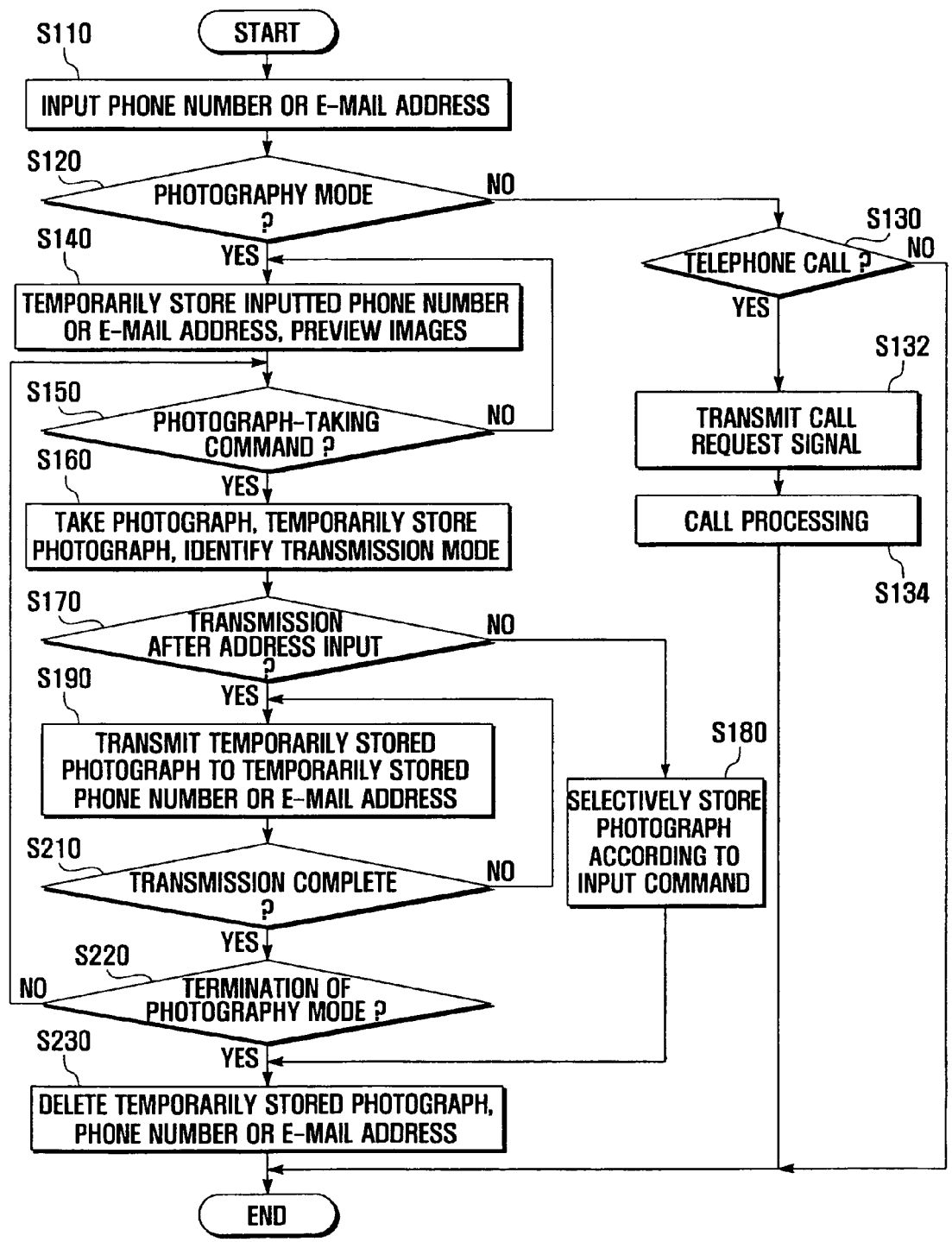
FIG. 4 is a flow chart illustrating a photograph transmission method using the camera-equipped portable terminal of FIG. 2 according to a first exemplary embodiment of the present invention.

FIG. 4 is a flow chart illustrating a photograph transmission method using the camera-equipped portable terminal of FIG. 2 according to a first exemplary embodiment of the present invention.

As shown in FIG. 4, when an address, such as a phone number, e-mail address, or address of a website permitting photograph upload, is input through the key input unit 140 or selected from the memory unit 170, the controller 110 displays the input or selected address through the display unit 156 at step S110. After display of the address, the controller 110 determines whether a photography mode command is input by pressing the photograph mode key 144 at step S120.

If a command other than the photography mode command is input, the controller 110 determines whether a call command is input at step S130. If a call command is input, the controller 110 transmits a call request signal to the address input at step S110 at step S132. In this call request transmission, the address is preferably a phone number. When an answer signal is received in response to the call request signal, the controller 110 establishes a communication channel for a phone call between the caller and the called party at step S134.

If the photography mode command is input at step S120, the controller 110 temporarily stores the address determined at step S110, controls the camera module 152 to capture images, and previews the captured images through the display unit 156 at step S140. The controller 110 then determines whether a photograph-taking command is input at step S150. If a command other than the photograph-taking command is input, the step S140 is repeated.

If the photograph-taking command is input, the controller 110 takes a photograph of a previewed image, temporarily stores the taken photograph, and identifies a transmission mode with reference to the transmission mode information 176 stored in the memory unit 170 at step S160. The controller 110 determines whether the identified transmission mode is 'photograph transmission after address input' at step S1170. If the identified transmission mode is not 'photograph transmission after address input', the controller 110 selectively stores the taken photograph in response to an input command at step S180.

If the identified transmission mode is 'photograph transmission after address input', the controller 110 controls the data processor 120 and wireless communication module 125 to transmit the photograph temporarily stored at step S160 to the address temporarily stored at step S140 at step S190. The controller 110 determines whether any taken photograph for transmission remains un-transmitted at step S210. If any photograph remains, step S190 is repeated.

If no photograph remains to be transmitted, the controller 110 determines whether a command of photography mode termination is input at step S220. If a command other than photography mode termination is input, the step S150 is repeated.

If the command of photography mode termination is input, the controller 110 deletes the address temporarily stored at step S140 and the photograph temporarily stored at step S160 according to an input command at step S230.

After input of an address, photographs taken in a photography mode are automatically transmitted to the input address, or specific photographs selected by the user are directly transmitted to the input address, therefore photographs taken for transmission can be rapidly and conveniently transmitted to a destination address.

Figure 5:
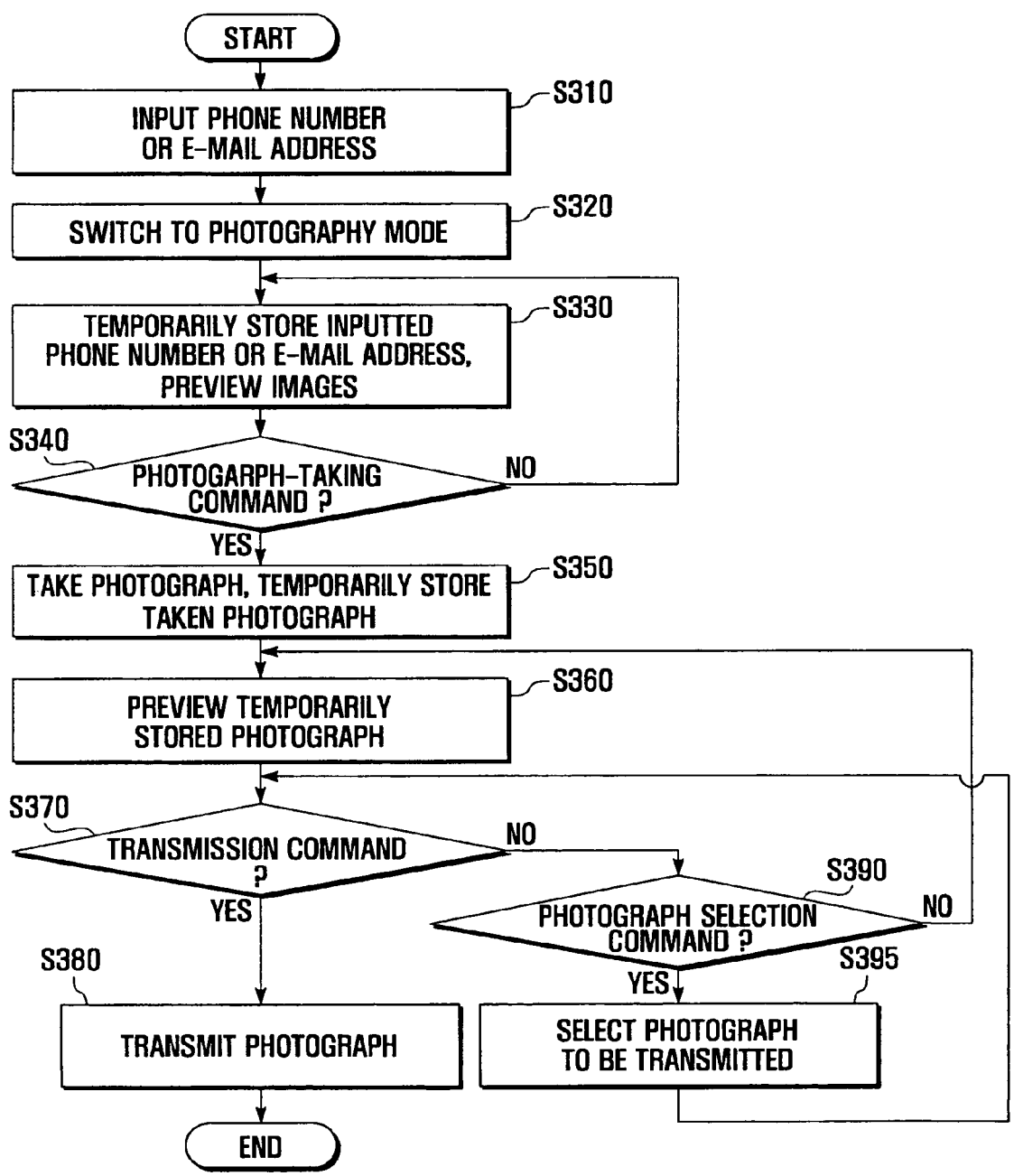
FIG. 5 is a flow chart illustrating the photograph transmission method using the camera-equipped portable terminal of FIG. 2 according to a second exemplary embodiment of the present invention.

FIG. 5 is a flow chart illustrating the photograph transmission method using the camera-equipped portable terminal of FIG. 2 according to a second exemplary embodiment of the present invention.

As shown in FIG. 5, when an address, such as a phone number, e-mail address, or address of a website permitting photograph upload, is input through the key input unit 140 or selected from the memory unit 170, the controller 110 displays the input or selected address through the display unit 156 at step S310. According to an exemplary implementation, when a photography mode command is input by pressing the photograph mode key 144 after display of the address, the controller 110 controls the camera module 152 to perform operations necessary for the photography mode at step S320.

The controller 110 temporarily stores the address given at step S310, controls the camera module 152 to capture images, and previews the captured images through the display unit 156 at step S330. During previewing, the controller 110 determines whether a photograph-taking command is input at step S340. If a command other than the photograph-taking command is input, step S330 is repeated.

If the photograph-taking command is input, the controller 110 takes a photograph of a previewed image, and temporarily stores the taken photograph at step S350. Step S350 may be repeated until the user inputs a photography termination command. The controller 110 previews one or more temporarily stored photographs through the display unit 156 at step S360.

During the photograph preview operation, the controller 110 determines whether a command to transmit the temporarily stored photographs is input at step S370. If a transmission command is input, the controller 110 controls the data processor 120 and wireless communication module 125 to transmit the photographs temporarily stored at step S350 to the address input at step S310 at step S380.

If a command other than the transmission command is input at step S370, the controller 110 determines whether a command to select a photograph to be transmitted is input at step S390. If a command other than the photograph selection command is input, the step S360 is repeated.

If the photograph selection command is input, the controller 110 selects one or more of the temporarily stored photographs according to user selections at step S395. The controller 110 then determines whether a command to transmit the selected photographs is input at step S370. If a transmission command is input, the controller 110 controls the data processor 120 and wireless communication module 125 to transmit the photographs selected at step S395 to the address input at step S310 at step S380.

Finally, the controller 110 may selectively delete or store the temporarily stored address and photographs according to an input command.

An exemplary embodiment of the present invention provides a portable terminal comprising a camera and a photograph transmission method using the portable terminal, wherein after input of a destination address, photographs taken in a photography mode are automatically transmitted to the destination address or specific photographs selected by the user are directly transmitted to the destination address, and thereby photographs taken for transmission can be rapidly and conveniently transmitted to the destination address.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A camera-equipped portable terminal comprising:
   a display unit for displaying at least one input address;
   a camera module for taking at least one photograph of target objects;
   a transmission mode setter for setting a transmission mode between a first transmission mode where the at least one photograph taken by the camera module is automatically transmitted to the at least one input address and a second transmission mode where the at least one photograph taken by the camera module is previewed, and then one or more photographs selected by user are transmitted to the at least one input address;
   a wireless communication module for transmitting photographs taken by the camera module to the input address through wireless communication; and
   a controller for (a) controlling the display unit to display at least one destination address set as the destination(s) for transmission of photographs to be taken before a photograph is taken and transmitted, (b) controlling the camera module to display images of target objects through the display unit in response to a photography mode command during display of the at least one destination address and taking at least one photograph in response to at least one photograph taking command, (c) referring to the transmission mode set by the transmission mode setter, (d) controlling the wireless communication module to transmit the at least one taken photograph to the at least one destination address, and (e) repeating (b) through (e) until a termination command is received.

2. The camera-equipped portable terminal of claim 1, wherein the display unit displays status information during transmission of the photographs to the input address.

3. The camera-equipped portable terminal of claim 2, wherein the display unit displays a selection menu enabling a user to determine whether to store at least one of the photographs.

4. The camera-equipped portable terminal of claim 1, wherein the input address comprises at least one of a phone number, e-mail address, and address of a website permitting photograph upload.

5. The camera-equipped portable terminal of claim 1, wherein the photographs comprise at least one of a still and moving image.

6. The camera-equipped portable terminal of claim 1, wherein the controller controls the wireless communication module to transmit the at least one taken photograph to the at least one destination address automatically when the transmission mode set by the transmission mode setter is the first transmission mode.

7. The camera-equipped portable terminal of claim 1, wherein the controller controls the display unit to preview the at least one taken photograph and controls the wireless communication module to transmit one or more photographs selected by user to the at least one destination address when the transmission mode set by the transmission mode setter is the second transmission mode.

8. The camera-equipped portable terminal of claim 7, further comprising a memory unit for temporarily storing, in response to the photography mode command, the input address displayed on the display unit and the photographs taken by the camera module, and for deleting, after completion of the selected-photograph transmission to the input address, the temporarily stored input address and photographs.

9. The camera-equipped portable terminal of claim 1, further comprising a memory unit for temporarily storing the input address displayed on the display unit in response to the photography mode command, and for deleting the temporarily stored input address after completion of the transmission of the photographs to the input address.

10. A photograph transmission method using a camera-equipped portable terminal, comprising:
   (a) inputting at least one destination address and displaying the input destination address set as the destination(s) for transmission of photographs to be taken;
   (b) operating, in response to a photography mode command, a camera module to display images of target objects;

(c) taking, in response to at least one photograph taking command during target-object image display, at least one photograph of the displayed images;

(d) identifying whether a transmission mode set by transmission mode setter is a first transmission mode where the at least one photograph taken by the camera module is automatically transmitted to the at least one input address or a second transmission mode where the at least one photograph taken by the camera module is previewed, and then one or more photographs selected by user are transmitted to the at least one input address;

(e) transmitting the at least one taken photograph to the at least one destination address; and (f) repeating (b) through (f) until a termination command is received;

wherein if the transmission mode is the first transmission mode, the at least one photograph taken by the camera module is transmitted to the at least one input address automatically, and if the transmission mode is the second transmission mode, the at least one photograph taken by the camera module is previewed, and then one or more photographs selected by user are transmitted to the at least one input address.

11. The photograph transmission method of claim 10, further comprising temporarily storing the displayed address in response to the photography mode command.

12. The photograph transmission method of claim 11, further comprising deleting the temporarily stored address after completion of photograph transmission.

13. The photograph transmission method of claim 10, wherein the input destination address comprises at least one of a phone number, e-mail address, and address of a website permitting photograph upload.

14. The photograph transmission method of claim 10, wherein the taken photographs are at least one of a still and moving image.

15. The photograph transmission method of claim 10, further comprising deleting the temporarily stored address after completion of selected-photograph transmission.

* * * * *